(12) United States Patent
Patterson et al.

(10) Patent No.: US 7,127,672 B1
(45) Date of Patent: Oct. 24, 2006

(54) CREATING AND MANAGING STRUCTURED DATA IN AN ELECTRONIC SPREADSHEET

(75) Inventors: Eric W. Patterson, Sammamish, WA (US); Robert Wayne Coffen, Redmond, WA (US); Su-Piao Bill Wu, Sammamish, WA (US); Michael J. McCormack, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 365 days.

(21) Appl. No.: 10/646,131

(22) Filed: Aug. 22, 2003

(51) Int. Cl.
*G06N 3/00* (2006.01)
(52) U.S. Cl. ...................... 715/503; 715/509
(58) Field of Classification Search ................ 715/503, 715/507, 508, 509, 505
See application file for complete search history.

(56) References Cited

U.S. PATENT DOCUMENTS

| | | | | |
|---|---|---|---|---|
| 6,167,523 A | * | 12/2000 | Strong | 726/21 |
| 6,625,499 B1 | * | 9/2003 | Abdalla | 700/25 |
| 2001/0007988 A1 | * | 7/2001 | Bauchot et al. | 707/100 |
| 2002/0055954 A1 | * | 5/2002 | Breuer | 707/507 |
| 2002/0103825 A1 | * | 8/2002 | Bauchot | 707/504 |
| 2002/0169799 A1 | * | 11/2002 | Voshell | 707/503 |

* cited by examiner

*Primary Examiner*—Stephen Hong
*Assistant Examiner*—Manglesh Patel
(74) *Attorney, Agent, or Firm*—Merchant&Gould LLC (57) ABSTRACT

An electronic spreadsheet is provided for automatically creating, expanding, and validating lists of cells. A list is created by receiving a user request for selecting a cell range, identifying a list range for the selected cell range, determining a header row for the list range, and generating a border for surrounding the list range. A list is expanded by determining that one or more cells are adjacent to the list and automatically expanding the list to include the new cells. A list is validated by determining a data type of data entered into the list and comparing the data type of the data entered into the list to a list data type. If, as a result of the comparison, the data type of the data entered into the list does not match the list data type, then the data type of the data entered into the list is invalid.

18 Claims, 8 Drawing Sheets

CREATING AND MANAGING STRUCTURED DATA IN AN ELECTRONIC SPREADSHEET

TECHNICAL FIELD

The present invention generally relates to spreadsheet data lists. More particularly, the present invention relates to the creation and management of structured data in an electronic spreadsheet.

BACKGROUND OF THE INVENTION

Electronic spreadsheets organize information into a matrix of columns and rows. Each column within a row is referred to as a cell. Each cell of an electronic spreadsheet stores a data element, such as text or numerical data, or a formula which uses data elements from other cells to calculate a desired result. Various data elements in multiple cells may be combined to create lists. For example, a list may be created to track the performance of salespersons for a national software company. Such a list may include a header row including field names such as the name of each salesperson, the geographic region assigned to each salesperson, and the amount of sales generated by each salesperson. The list may also include one or more data rows following the header row for displaying data associated with each field name. Field names in a header row may be manually formatted by a user to set them apart from associated data rows. The list may further include a formula for calculating a combined sales total for all salespersons in the company.

Often, new data elements are added to spreadsheet cells in order to expand a previously created list. For example, a new column of cells storing data elements may be added to a two-column list resulting in the list being expanded to three columns. In order to facilitate data entry, electronic spreadsheets may also include functionality to apply a variety of data types which restrict the type of data which may be entered into a cell. Illustrative data types include text, number, currency, date and time, hyperlink, etc. For example, the cells in a header row may be restricted to a text data type. Data types may usually be applied to a single cell or a group of cells (i.e., rows and/or columns) in a spreadsheet. Thus, a typical electronic spreadsheet may include a variety of different data types at a given time.

In prior electronic spreadsheets, lists are created in an ad-hoc fashion without any support for automatic recognition of the range the list may have, headers (i.e., field names), and formulas which may be present in a range of cells storing data elements. In these prior electronic spreadsheets, cells containing headers must be manually selected and formatted (if desired) by a user through commonly known user interface techniques, such as selecting options from a pull-down menu. Similarly, "total" cells reflecting the result of an aggregation of cells due to a formula must also be manually defined and/or formatted by the user. Furthermore, prior electronic spreadsheets fail to provide support for automatically recognizing new cells added to expand an existing list. For example, prior spreadsheets make no distinction between new cells storing field names and new cells storing data and/or formulas without manual intervention by the user. Finally, prior electronic spreadsheets provide no automatic validation of data elements added to cells in a list based on a data type previously defined for a cell or range of cells.

Thus, significant drawbacks found in prior electronic spreadsheets include the inability to recognize data elements in the creation and expansion of lists and the inability to automatically validate cell data elements, without instruction from the user. It is respect to these considerations and others that the present invention has been made.

SUMMARY OF THE INVENTION

In accordance with the present invention, the above and other problems are solved by providing an electronic spreadsheet with functionality for automatically creating, expanding, and validating lists of cells, without manual intervention by a user. As a result, the electronic spreadsheet provides a structure for data in the list which may be easily managed by a user.

According to one aspect, the present invention relates to a method in a computer system for displaying on a display device an automatically created list in an electronic spreadsheet. The method includes receiving a user request for selecting a cell range in the electronic spreadsheet, identifying a list range for the selected cell range in the electronic spreadsheet, determining a header row for the list range, generating a border for surrounding the list range to create the list, and displaying the created list on the display device. The list range for the selected cell range in the electronic spreadsheet may be identified based on the number of cells in the selected cell range. If the selected cell range contains two or more cells, then the list range is identified as the selected cell range. On the other hand, if the selected cell range contains exactly one cell, then the list range is identified based on the location of the cell in a current region of the electronic spreadsheet. The header row for the list range may be determined based on whether the list range includes a field name for each column in the cell range. If the identified list range does not include any field names, then a unique field name is automatically generated for each column in the cell range. The list may also include a blank row for inserting data into the list. The method may also include identifying a user total row for calculating one or more aggregation functions for data stored in one or more cells in the selected cell range.

According to another aspect, the present invention relates to a method for automatically expanding a list in an electronic spreadsheet. The method includes determining that at least one previously blank newly edited cell is adjacent to the list, and automatically expanding the list to include the at least one previously blank newly edited cell. The list may also be expanded to include a new column or a new row containing the at least one previously blank newly edited cell. In determining that at least one previously blank newly edited cell is adjacent to the list, it may be determined that the at least one previously blank newly edited cell is adjacent to a header row in the list. It may also be determined that the at least one previously blank newly edited cell is adjacent to a data row in the list. The header row may contain field names identifying data in subsequent data rows in the list. If the at least one previously blank newly edited cell is adjacent to a header row in the list, then a determination may made as to whether a data entry in the at least one previously blank newly edited cell duplicates an existing field name in the header row in the list. If the data entry in the at least one previously blank newly edited cell is identical to an existing field name in the header row in the list, then the data entry is changed to a unique field name. On the other hand, if the data entry in the at least one previously blank newly edited cell is not identical to an existing field name in the header row in the list, then the data entry is assigned as a field name for the new column. If the at least one previously blank newly edited cell is adjacent to a data row in the list, then a field name is automatically generated.

According to another aspect, the present invention relates to a method for managing data validation for structured data or a list in an electronic spreadsheet. The method includes determining a data type of data entered into the list and comparing the data type of the data entered into the list to a list data type. If, as a result of the comparison, the data type of the data entered into the list does not match the list data type, then the data type of the data entered into the list is invalid and a data validation alert may be displayed. If the data type of the data entered into the list matches the list data type, then a further determination is made to determine the validity of the data entered into the list based on the data type. If the data entered into the list is invalid based on the data type, then an error indicator is displayed in the electronic spreadsheet. The data may be entered into the list by typing or pasting into list cells. Incorrect data type errors found in selected or active cells may be indicated by a data validation alert while incorrect data type errors found in non-selected or inactive cells may be indicated by an error indicator displayed in the electronic spreadsheet.

According to another aspect, the present invention relates to a display device displaying a spreadsheet including structured data. The structured data includes a list range including rows and columns for displaying data, a header row for identifying the columns in the list range, and a border for surrounding the list range. The structured data may further include an insert row following the list range for inserting data, a total row for entering a plurality of aggregation functions for the data displayed in the list range, and a filter control for each column in the list range for filtering the displayed data. The insert row may include an indicator for identifying an initial cell in the insert row. The border may include a handle for manually resizing the structured data. The structured data may also include an active state, when the structured data is selected, and an inactive state, when the structured data is not selected. When the structured data is in the inactive state, the insert row and filter control may be hidden so that they are no longer visible to a user.

Other aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Embodiments of the present invention provide an electronic spreadsheet with functionality for automatically creating, expanding, and validating lists of cells, without manual intervention by a user. As a result, the electronic spreadsheet provides a structure for data in the list which may be easily managed. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Figure 1:
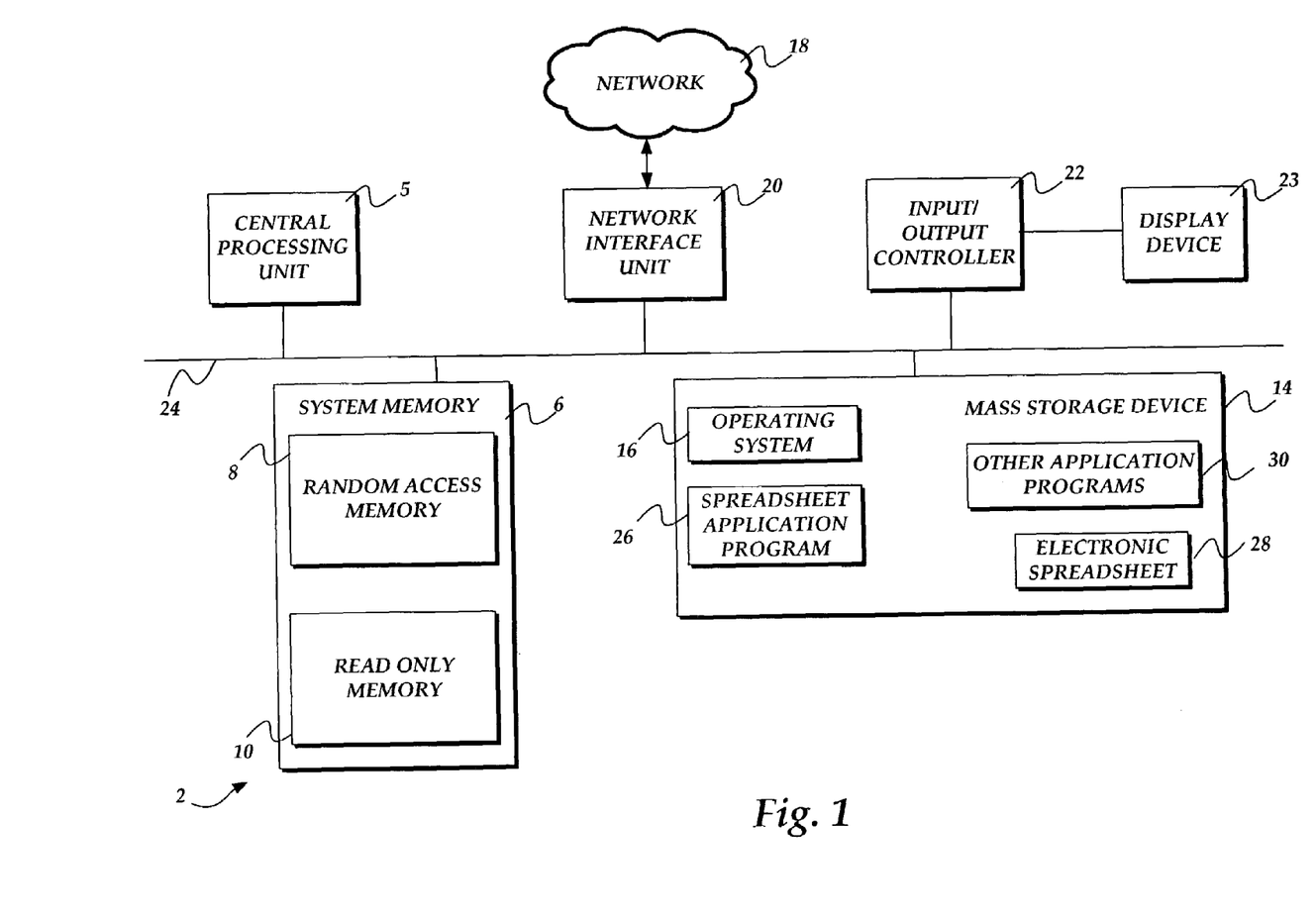
FIG. 1 illustrates a functional block diagram of a computer system that provides an operating environment for the illustrative embodiments of the present invention.

FIG. 1 and the following discussion are intended to provide a brief, general description of a suitable computing environment in which the invention may be implemented. While the invention will be described in the general context of program modules that execute in conjunction with an application program that runs on an operating system on a computer system, those skilled in the art will recognize that the invention may also be implemented in combination with other program modules. Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, a functional block diagram of a computer system that provides an operating environment for the illustrative embodiments of the present invention will now be described. The computer system 2 may include a standard personal computer operative to execute one or more application programs, such as spreadsheet application program 26, for generating an electronic spreadsheet 28. Alternatively, the computer system 2 may include another type of computing device operative to access a network 18, such as a personal digital assistant or other type of computer. The computer system 2 includes a central processing unit 5 ("CPU"), a system memory 6, including a random access memory 8 ("RAM") and a read-only memory ("ROM") 10, and a system bus 13 that couples the system memory 6 to the CPU 4.

The computer system 2 further includes a mass storage device 14 for storing an operating system 16, the spreadsheet application program 26, the electronic spreadsheet 28, and other application programs 30. In one embodiment of the present invention, the spreadsheet application program 26 may be the EXCEL spreadsheet application program marketed by MICROSOFT CORPORATION of Redmond, Wash. The electronic spreadsheet 28 may be a file generated by the spreadsheet application program 26 for organizing information into a matrix of columns and rows of cells known as lists. The electronic spreadsheet 28 will be described in greater detail below in the description of FIGS. 2–3.

The mass storage device 14 is connected to the CPU 5 through a mass storage controller (not shown) connected to the bus 13. The mass storage device 14 and its associated computer-readable media, provide non-volatile storage for the computer system 2. Although the description of computer-readable media contained herein refers to a mass storage device, such as a hard disk or CD-ROM drive, it should be appreciated by those skilled in the art that computer-readable media can be any available media that can be accessed by the computer system 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the computer system 2 may operate in a networked environment using logical connections to remote computers, through the network 18. The computer system 2 may connect to the network 18 through a network interface unit 20 connected to the bus 13. It should be appreciated that the network interface unit 20 may also be utilized to connect to other types of networks and remote computer systems. The computer system 2 may also include an input/output controller 22 for receiving and processing input from a number of devices, including a keyboard, mouse, or electronic stylus (not shown). Similarly, an input/output controller 22 may provide output to a display device 23, a printer (not shown), or other type of output device.

Figure 2:
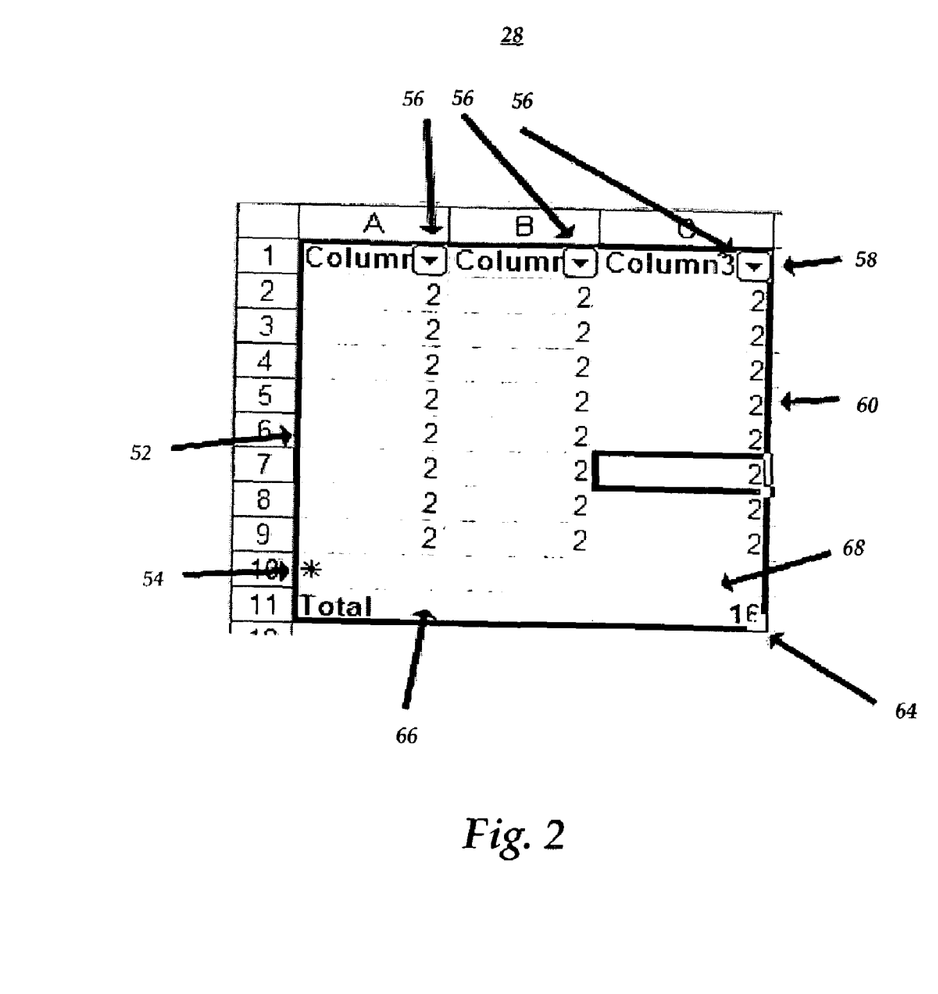
FIG. 2 illustrates a display of an electronic spreadsheet showing a list or structured data, according to an illustrative embodiment of the present invention.

FIG. 2 illustrates a display of the electronic spreadsheet 28 according to an illustrative embodiment of the present invention. The display corresponds to the display state of the electronic spreadsheet 28 after a user has initiated the creation of a list in the spreadsheet and has selected the list for editing. As shown, the list includes a border 52 which serves as a visual demarcation for data in the cell range A1:C9. The list also includes a header row 58 (Row 1) for displaying field names for each of the columns A, B, and C in the electronic spreadsheet 28. The list further includes data rows 60 (Rows 2–9) following the header row 58, for displaying various types of data. As shown, the cells in the header row may be formatted in bold text to distinguish them from the cells in the data rows 60. It will be appreciated other types of formatting may also be used for cells in the header row or, alternatively the header row may contain no special formatting at all.

The list also includes a new line row 68 (Row 10) for providing a user location to enter new data. The new line row 68 may also include a visual indicator 54 (as shown in cell A10). The list further includes a resize handle 64 so that a user may add or remove columns or rows. The list further includes a Total row 66 (Row 11). As shown, the Total row is formatted such that the word "Total" is displayed in the leftmost column (Column A) and the result of an aggregation function or formula is displayed in the right-most column (Column C). It will be appreciated by those skilled in the art that the layout of the Total row 66, as shown in FIG. 2 is arbitrary and that other layouts and or formatting may be applied without departing from the scope of the present invention.

The Total row 66 display may be toggled on or off by a user by selecting a menu item or by interfacing with a toolbar in the spreadsheet application program 26 as will be discussed in greater detail with respect to FIG. 3, below. The Total row 66 allows for the entry and calculation of aggregation functions in one or more cells that refer to data stored in a cell range in the spreadsheet. The aggregation functions may be selected by a user and entered in the appropriate cell in the Total row 66 (e.g., cell C11). Aggregation functions in spreadsheets are well-known to those skilled in the art and may include "Average," "Count," "Max," "Min," "StDev," "Sum," and "Var." For example, cell C11 in the Total row 66 includes an aggregation function for calculating the sum of the data in Column 3 (cells C2:C9). It will be appreciated that similar to the header row, the Total row 66 may also be formatted to distinguish it from the data rows 60. Furthermore, the formatting applied to the Total row 66 may be remembered by the spreadsheet application program 26 when the Total row 66 is toggled off by a user.

The list also includes filter controls 56 which are used to access a dropdown menu for an autofilter user feature in the spreadsheet 28 for each of the columns A, B, and C. As is known to those skilled in the art, the autofilter feature enables a user to select a sorting method for data in a column as well as filtering out (i.e, hiding) a subset of data rows, in a spreadsheet.

It should be understood that the list described above is an "active" list. In accordance with the various embodiments of the present invention, lists may be displayed in one of two states, "active" and "inactive." A list is in an active state (i.e., an active list) when any portion of the list is selected (e.g., by a user clicking on the list using a mouse). A list is in an inactive state (i.e., an inactive list) when the list is not selected. The concept of active and inactive lists will discussed in greater detail below with respect to FIG. 3.

Figure 3:
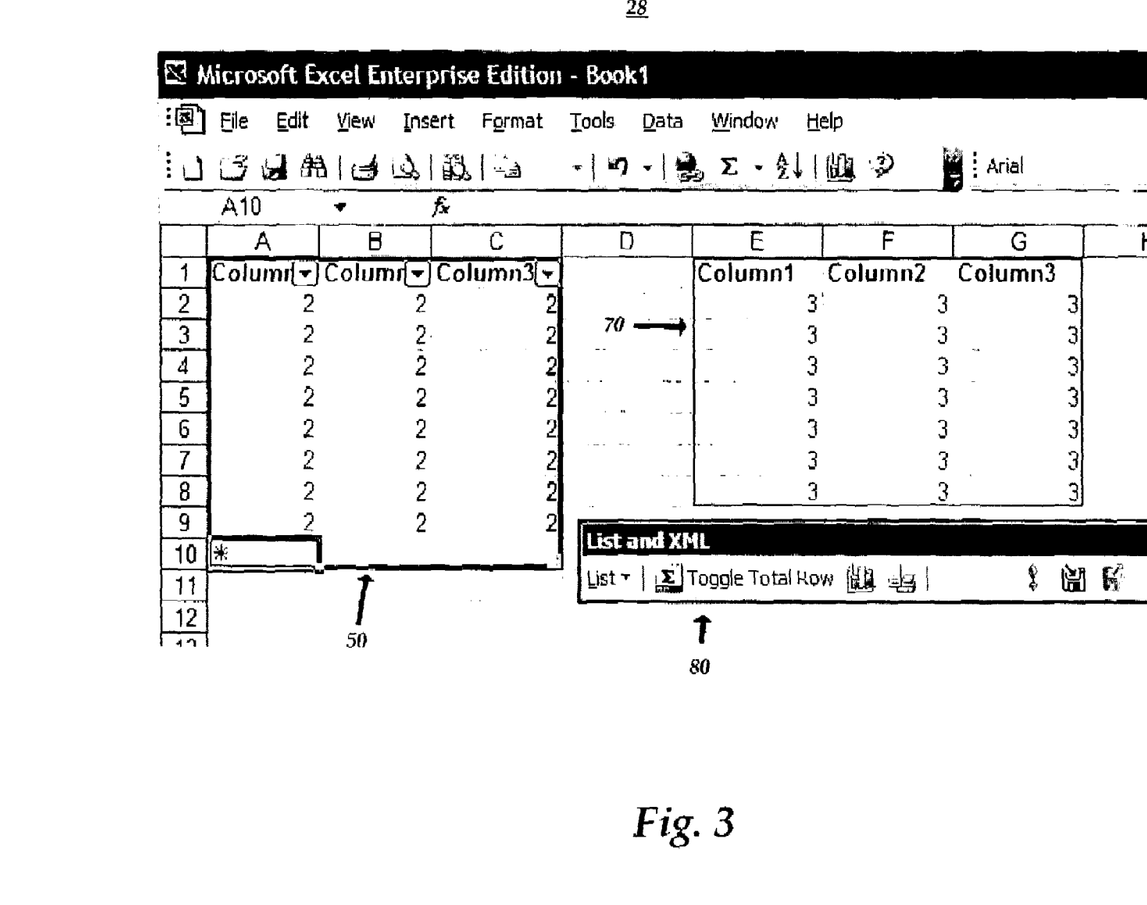
FIG. 3 illustrates a display of an electronic spreadsheet showing the list of FIG. 2 in an active state and an inactive state, as well as a toolbar for creating and managing the list, according to an illustrative embodiment of the present invention.

FIG. 3 illustrates a display of an electronic spreadsheet showing an active list and an inactive list, as well as a toolbar for creating and managing lists, according to an illustrative embodiment of the present invention. As shown, the display shows the spreadsheet 28 which includes an active list 50, an inactive list 70, and a toolbar 80. The active list 50 includes a header row (Row 1), data rows (Rows 2–9), a new line row (Row 10), a resize handle, and filter controls for sorting the data in list columns A, B, and C. The active list 50 is also surrounded by a border which serves as a visual demarcation of the data in the spreadsheet 28.

The inactive list 70 includes a header row (Row 1) and data rows (Rows 2–8). It will be appreciated that an inactive list may also display a Total row if a Total row is displayed in the corresponding active list. As shown, the inactive list 70 is also surrounded by a border. It will also be appreciated, as shown in FIG. 3, that the active list 50 may have a wider border than the inactive list 70 to further differentiate the active list from the inactive list. For example, in one embodiment, the active list 50 may be displayed having a three-pixel wide border while the inactive list 70 may displayed having a one-pixel wide border. Alternatively, a user may choose to display the inactive list 70 without a border.

It should be understood that the list state may also determine whether a user is editing the list or the spreadsheet. For example, while a list is selected (making it an active list), a user may choose to edit list cell data while a user may elect to edit non-selected spreadsheet data when the list is inactive. It will be appreciated however, that a user may also edit non-active lists. For example a user may write a macro for editing inactive list cells. It will further be appreciated that many of the features discussed above with respect to active lists also apply to inactive lists even though inactive lists do not contain the same visual cues in the user interface. For example, even though the inactive list 70 does not display a resize handle, the list may be resized by "grabbing" a corner of the list enabling a user to add or remove columns or rows.

As further shown in FIG. 3, the toolbar 80 serves as a user interface for executing various commands to create and manage lists in the spreadsheet 28. It should be understood that the toolbar 80 as shown in FIG. 3 is illustrative only and that other user interfaces (UIs) may be utilized for performing the functionality of the toolbar 80 without departing from the scope of the present invention. The toolbar 80 also includes a button toggling a Total row display in lists including aggregation functions. Although the toolbar 80 is shown as "floating," in the spreadsheet 28, it will be appreciated that in alternative embodiments, the toolbar 80 may be "docked" to the spreadsheet's dropdown menu so that it is displayed above the spreadsheet 28. In other alternative embodiments, the toolbar 80 may be turned off and the various commands executed from the spreadsheet's dropdown menu. The various commands which may be executed will be described in greater detail below in the discussion of FIGS. 4–11.

Figure 4:
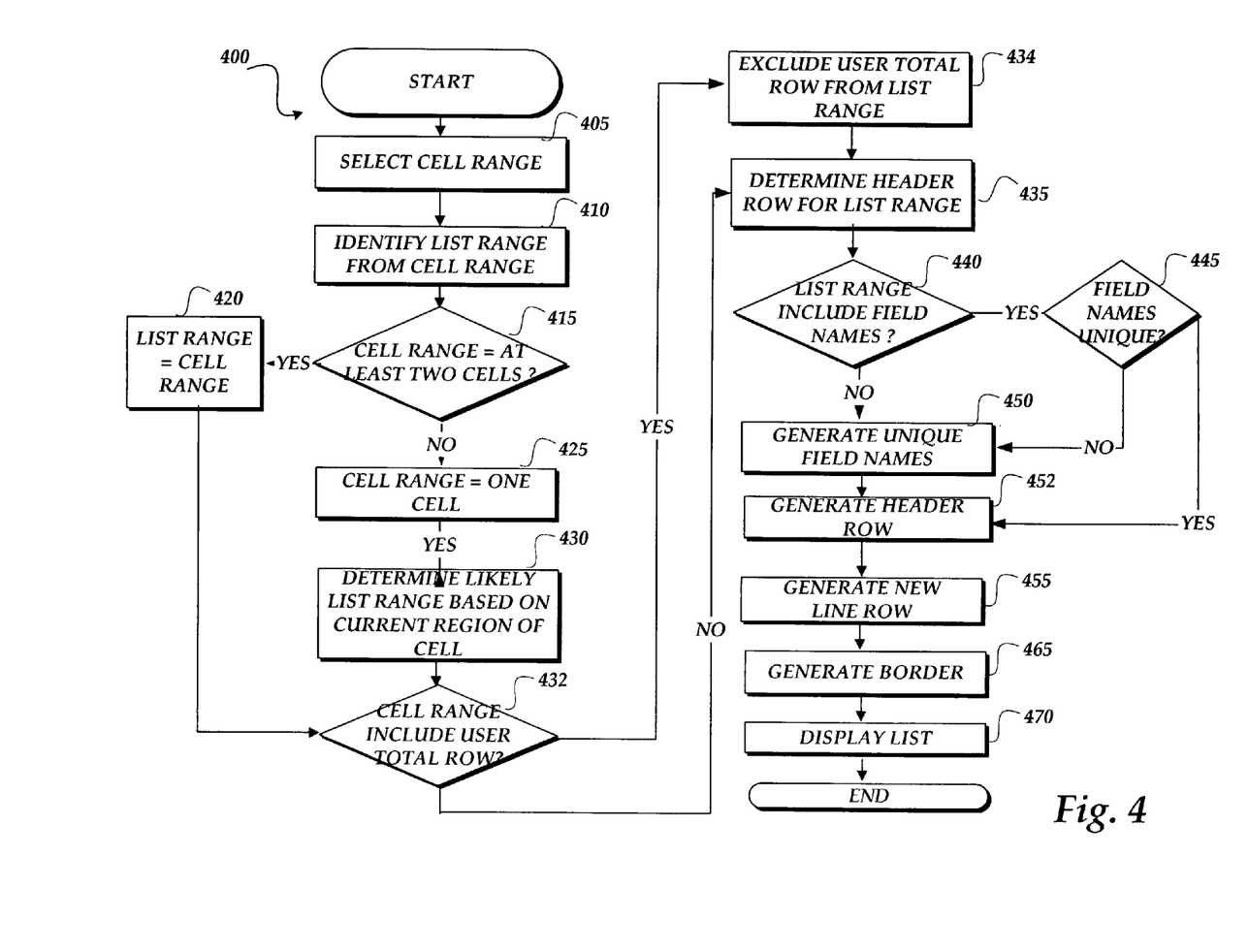
FIG. 4 is a flow chart illustrating logical operations for automatically creating a list in an electronic spreadsheet, according to an illustrative embodiment of the invention.
Figure 5:
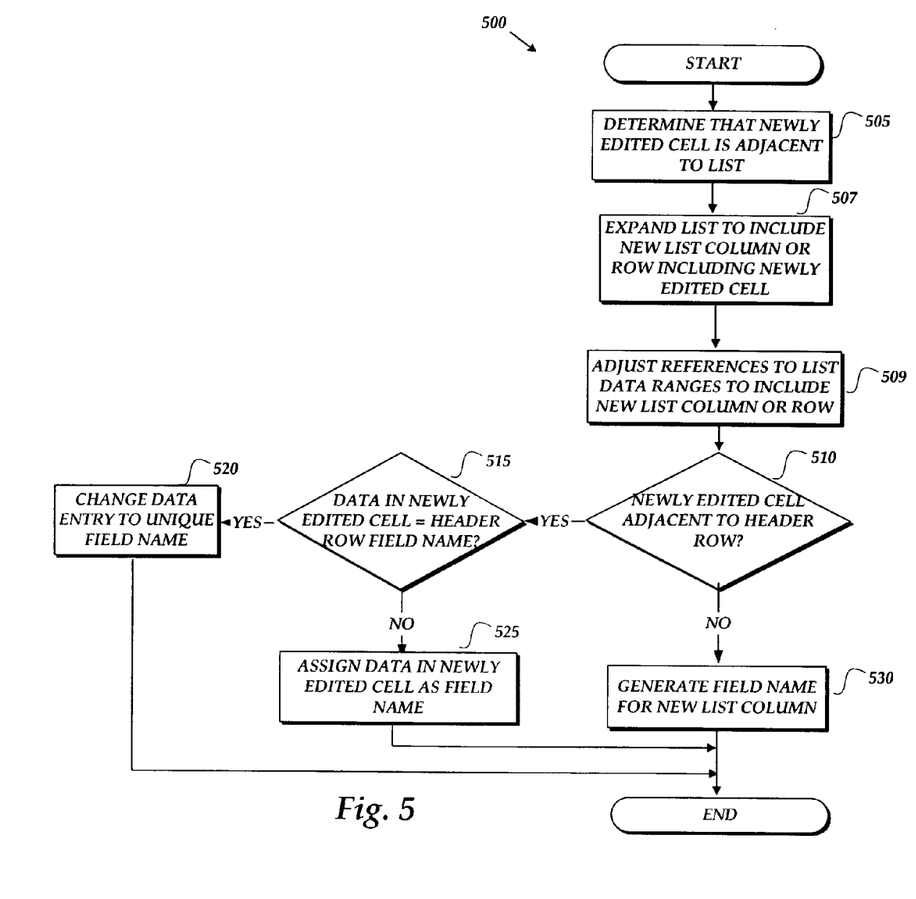
FIG. 5 is a flow chart illustrating logical operations for automatically expanding a list in an electronic spreadsheet, according to an illustrative embodiment of the invention.
Figure 6:
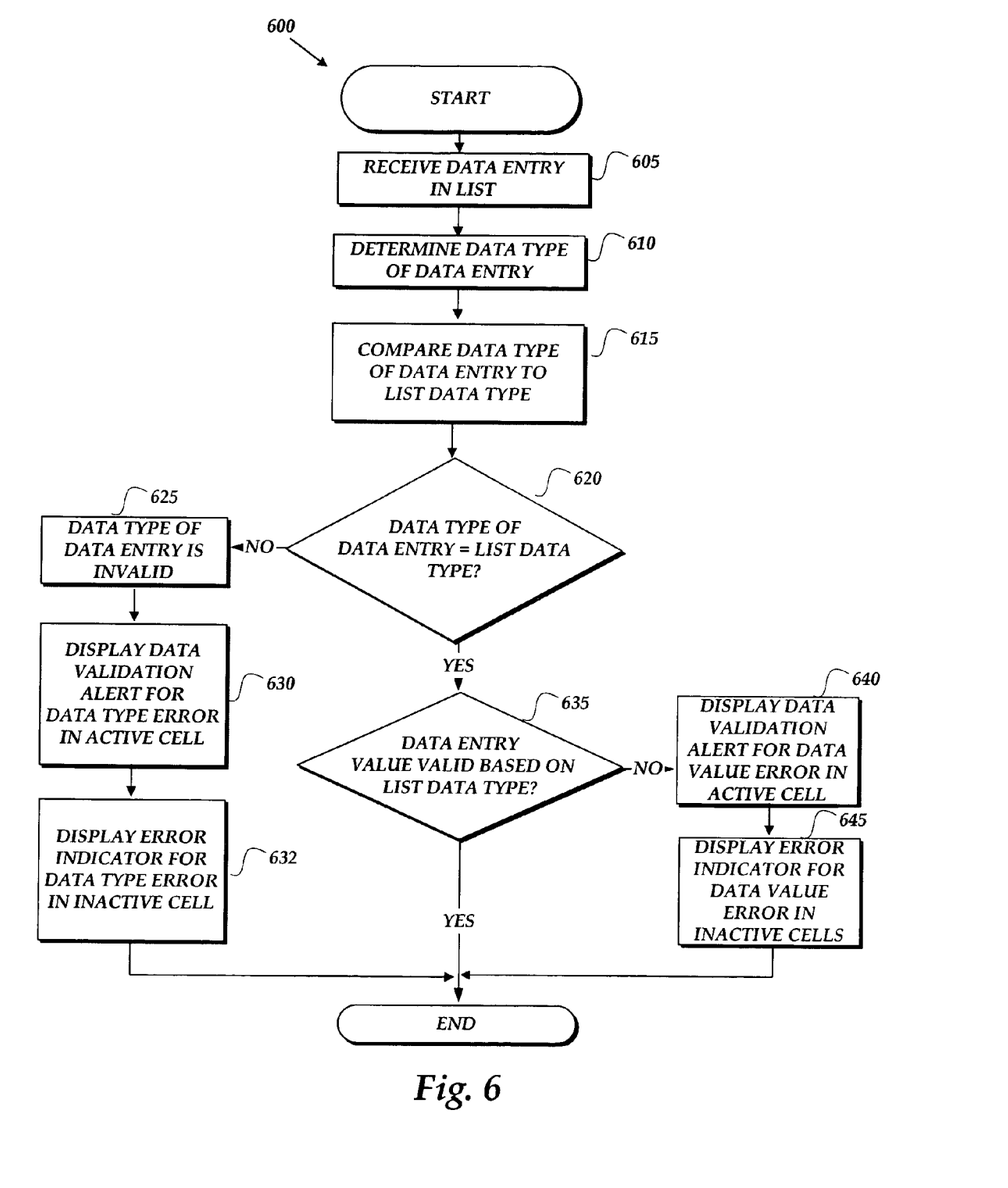
FIG. 6 is a flow chart illustrating logical operations for automatically validating data in a list in an electronic spreadsheet, according to an illustrative embodiment of the invention.

FIGS. 4–6 illustrate logical operations for creating and managing lists in the electronic spreadsheet 28 described above with respect to FIGS. 1–3, according to an illustrative embodiment of the invention. The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

FIG. 4 describes logical operations 400 involved in creating a list in an electronic spreadsheet according to an illustrative embodiment of the present invention. The logical operations 400 begin at operation 405 in which a user of an electronic spreadsheet selects a cell range of one or more cells (i.e., selecting multiple cells in a row or column or both) from which to create a list. It should be understood that the user-selected cell range may or may not contain data. It will be appreciated that the list creation may be initiated by a user accessing the toolbar 80 in the electronic spreadsheet 28 (described above with respect to FIG. 3) and selecting a "Create List" command from the List dropdown menu.

The logical operations 400 continue at operation 410 where the spreadsheet application program 26 identifies a list range from the user-selected cell range in the spreadsheet program 28. The list range is used to determine the size of the list. In identifying the list range, a determination is made as to whether the cell range includes at least two cells at operation 415. If at operation 415, it is determined that the cell range consists of at least two cells, then it is determined that the list range (which determines the size of the list) equals the cell range at operation 420. The logical operations 400 then continue from operation 420 to operation 432. For example, referring back to FIG. 2, it the selected cell range consists of cells A1:B2, then these four cells would make up the list range for the list.

If however, it is determined that the cell range does not consist of at least two cells at operation 415, then it is determined that the cell range consists of a single cell at operation 425. Then, at operation 430, a likely list range for the single cell is determined based on the current region of the spreadsheet containing the cell. For example, referring again to FIG. 2, if the selected cell range consists of cell A2, then the list range for the cell may be determined to be the region consisting of Row 2 or Column A. It will be appreciated by those skilled in the art that a selection algorithm may utilized to select the most likely list range for the cell. Such an algorithm may be similar or identical to existing algorithms used in electronic spreadsheet programs including, but not limited to, algorithms for expanding ranges for sorting and for determining PivotTables. Such algorithms are well known to those skilled in the art. The logical operations 400 then continue from operation 430 to operation 432.

At operation 432, the spreadsheet application program 26 determines whether the selected cell range includes a user total row in the spreadsheet 28. This determination may be made by identifying any rows in the selected cell range which are used to calculate totals or other aggregate functions. A user total row includes one or more cells for calculating user-selected aggregation functions for data in a spreadsheet cell range. The results of the aggregation functions may then be displayed to a user in the spreadsheet. At operation 432, if a user total row is identified, the logical operations 400 continue to operation 434 where the spreadsheet application program 26 excludes the user total row from the list range.

The logical operations 400 continue from operation 434 to operation 435 where the spreadsheet application program 26 determines a header row for the previously identified list range. As shown in FIGS. 2–3, a list includes a header row containing headers or field names for identifying one or more columns in the list. At operation 440 it is determined whether the list range includes headers or field names. It will be appreciated that in one embodiment, after a list range is identified, a user may communicate to the spreadsheet application program whether or not a list range has headers. For example, after issuing the command to create a list from a selected cell range, a checkbox may be displayed allowing the user to select whether or not the list will have headers based on whether or not the cell range has headers. If no headers are specified by the user, the spreadsheet application program may automatically determine headers for the list at operation 440 by recognizing field names in the identified list range. Those skilled in the art will appreciate that a variety of known methods may be employed to recognize field names in the identified list range. For example, field names may be recognized based on a row of text data followed by one or more rows of numerical data.

If at operation 440, it is determined that the identified list range includes field names, then the spreadsheet application program 26 determines if the field names in the list range are unique, at operation 445. If at operation 445 it is determined that the field names are unique, then a header row is generated using the field names, at operation 452. The cells consisting of the header row will be inserted by the spreadsheet application program 26 at the top of the list range for the generated field names. The logical operations 400 then continue from operation 452 to operation 455. If, however, it is determined at operation 445 that the field names are not unique, then the logical operations 400 continue at operation 450 where the spreadsheet application program 26 will automatically generate unique field names for each column in the list range. For example, if the spreadsheet application program 26 determines that a field name in a cell in the list range is identical to a field name in a subsequent cell in the list range, then the field name in the subsequent cell in the header row is modified to a unique field name. Thus, a cell in a list range having a field name "West" which is identical to a previous cell in the list range would have its field name modified to "West2" by the spreadsheet application program. The logical operations 400 then continue from operation 450 to operation 452.

Returning now to operation 440, if it is determined that the list range does not include field names, then the spreadsheet application program 26 will automatically generate a unique field names for each column in the list range at operation 450, as discussed above. The logical operations 400 then continue from operation 450 to operation 452. In one embodiment, the generated field names will be of the form "ColumnN," where N is a number starting at 1. For example, in the list of FIG. 3, the list 70 displays a header row (Row 1), which might be automatically generated according to one embodiment of the invention. Those skilled in the art will appreciate that the above-described naming convention for field names may be altered without departing from the spirit and scope of the various embodiments of the present invention.

At operation 452, the spreadsheet application program 26 generates a header row with unique field names in the spreadsheet 28. The logical operations 400 continue from operation 452 to operation 455 where the spreadsheet application program 26 generates an insert or new line row in the spreadsheet 28. As discussed above with respect to FIG. 2, the new line row enables a user to enter new list data. As shown in FIG. 2, the new line row may be a blank row immediately following any data rows in the list. After data is entered into one or more cells in the new line row, the data may be committed by any of the following conventional means: Enter, Tab, Arrow Keys, and clicking outside the active cell. Once the data is entered and committed into the new line row, another new line row will be displayed after the new data row. It will be appreciated that the new line row may be formatted by a user. Any formatting applied to the new line row will stay with the row after it is added to the list when the list is in the active state. It will further be appreciated that a new line row will always be present in an active list, even when there are no data rows. In a list containing no data rows (i.e., only a header row), the spreadsheet application program 26 generates a forced insert row. The forced insert row is visible to the user regardless of whether the list is active or inactive to provide a visual cue for the user and to facilitate the user clicking into the list to add data.

The logical operations 400 continue from operation 455 to operation 465 where the spreadsheet application program 26 generates a border surrounding the list range, the new line row, and (if applicable) the Total row to create a list. As discussed above with respect to FIG. 2, the border may serve as a visual demarcation for the list. In generating the border, the spreadsheet application program 26 may also generate a resize handle (discussed above with respect to FIG. 2) for resizing a list to add or remove columns or rows. The logical operations 400 then continue from operation 465 to operation 470 where the spreadsheet application program 26 displays the list in the spreadsheet 28. The logical operations 400 then end. As discussed above with respect to FIGS. 2–3, a list may have active and inactive states. When the list is active and contains data, the AutoFilter function may be turned on and AutoFilter dropdowns may be displayed for each column in the list for sorting the data or hiding a subset of data rows.

FIG. 5 describes logical operations 500 involved in automatically expanding a list in an electronic spreadsheet according to an illustrative embodiment of the present invention. It will be appreciated that a list may be expanded regardless of whether it is in an active state or an inactive state. The logical operations 500 begin at operation 505 in which the spreadsheet application program 26 determines whether one or more previously blank newly edited cells in a spreadsheet are adjacent to an existing list. This determination may be made by scanning cells on one side of the list or by scanning cells below a list (in lists without a Total row), to identify a data entry into any adjacent cells. It will be appreciated by those skilled in the art that the spreadsheet application program 26 may utilize an algorithm to determine the most logical side of the list to scan based on a language of the data entry. For example, in English or other left-to-right languages (LTR), the scanning would be done on a right side of a list. On the other hand, in right-to-left (RTL) languages, such as Hebrew or Arabic, the scanning would be done on the left side of a list. It will further be appreciated that the data entry may be made by any number of conventional means including typing the data directly into an adjacent cell, pasting the data into one or more adjacent cells, or using the "CTRL+ENTER" function to insert the data into multiple adjacent cells simultaneously.

Once the spreadsheet application program 26 determines that one or more newly edited cells are adjacent to the list, the logical operations 500 continue from operation 505 to operation 507 where the spreadsheet application program 26 expands the list by adding a new column (or a new row in lists not containing a Total row), including the one or more newly edited adjacent cells, in the spreadsheet 28. The logical operations 500 then continue from operation 507 to operation 509 where the spreadsheet application program 26 adjusts and existing "references" to list data ranges to include the newly added list column or list row. These references may include formulas in cells, labels (also known as defined names), charts, PivotTable Reports, and data validation. For example, if the list 50 shown in FIG. 3 is expanded to include a new row having a data value of "2" in cell C10, a sum formula for the list column data range C2:C9 may be updated to include the cell C10 in the new row. Thus, in the expanded version list, the sum formula would be updated to include the list column data range C2:C10.

The logical operations 500 then continue from operation 509 to operation 510 where the spreadsheet application program 28 determines whether any of the newly edited cells are adjacent to a header row in the list. If it is determined that a newly edited cell is adjacent to a header row in the list, the logical operations 500 continue to operation 515 where the spreadsheet application program 26 determines whether the data entry in the newly edited cell is identical to a field name in the header row of the existing list. If at operation 515, it is determined that the newly edited cell data is identical to a field name in the header row of the existing list, then the newly edited cell data is modified to a unique field name for a new column in the expanded list, by the spreadsheet application at operation 520 and the logical operations 500 then end. On the other hand, if at operation 515 it is determined that the newly edited cell data is not identical to a field name in the header row of the existing list, the newly edited cell data is assigned as a field name in the expanded header row at operation 525 and the logical operations 500 then end.

It will be appreciated that the field naming convention used in creating a list (as discussed above with respect to FIG. 4) may also be used in determining the modified field name at operation 520. For example, if the data in the newly edited cell and the field name in the header row are both "East," the data in the newly edited cell may be modified to "East2" by the spreadsheet application program 26 so that it is unique.

Returning now to operation 510, if it is determined that the newly edited cell is not adjacent to a header row, the logical operations 500 continue operation 510 to operation 530 where the spreadsheet application 26 determines that the newly edited cell is adjacent to a data row and automatically generates a field name for the new column containing the newly edited cell. The generation of the field name may be accomplished using the method described above with respect to FIG. 4. The logical operations 500 then end.

It will be appreciated that the list may also be expanded by receiving data in a new line row at the bottom of the list. As briefly discussed above in the description of FIG. 4, when data is committed into the new line row, the spreadsheet application program 26 will expand the list to include the new data and another new line row will be displayed following the new data row. Furthermore, any formulas in the last list data row (i.e., the row immediately preceding the new data row) will be automatically copied to the new data row It will further be appreciated that in alternative embodiment of the invention, the spreadsheet application program 26 may expand a list in response to an "Insert Column" command or an "Insert Row" command issued by a user. The Insert Column and Insert Row commands may be initiated by the user from the toolbar 80 described in FIG. 3 above, or by accessing the "Insert" dropdown menu from the menu bar in the spreadsheet application program 26.

FIG. 6 describes logical operations 600 involved in automatically validating data entered into a list in an electronic spreadsheet according to an illustrative embodiment of the present invention. The logical operations 600 begin at operation 605 in which data is received in a list in the electronic spreadsheet 28 from a user. It will be appreciated that data entry into the list may be made by any number of conventional means including typing the data directly into a list cell, pasting the data into one or more list cells, or using the "CTRL+ENTER" function to insert the data into multiple list cells simultaneously.

At operation 610, the spreadsheet application program 26 determines the data type of the data entered into one or more list cells. As is known to those skilled in the art, electronic spreadsheets may include functionality to apply a variety of data types which restrict the type of data which may be entered into a cell. Well-known data types include text, number, currency, date and time, lookup, choice, hyperlink, etc. As is further known to those skilled in the art, electronic spreadsheets may also include functionality restricting the values of various data types. For example, a "text" data type may be restricted to a maximum of 255 characters in a spreadsheet. Thus, any text data entry consisting of more than 255 characters would be invalid. Data types may be applied to a single cell or a group of cells (i.e., rows and/or columns) in a spreadsheet. In determining the data type of the data entered into the list, the data is compared to a list of known data types stored in the spreadsheet application program 26. Of course, it will be appreciated that spreadsheet cells are not required to have data types, and in such cases any data type and/or value may be entered into a cell.

Figure 7:
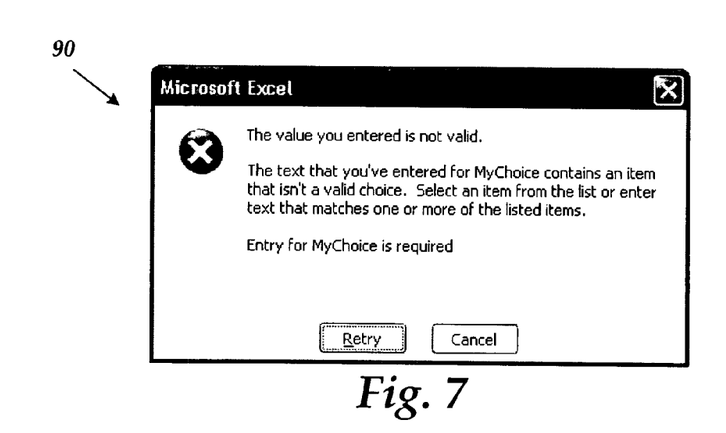
FIG. 7 illustrates an error dialog generated in response to identifying a data type error in an active list cell in an electronic spreadsheet, according to an illustrative embodiment of the invention.
Figure 9:
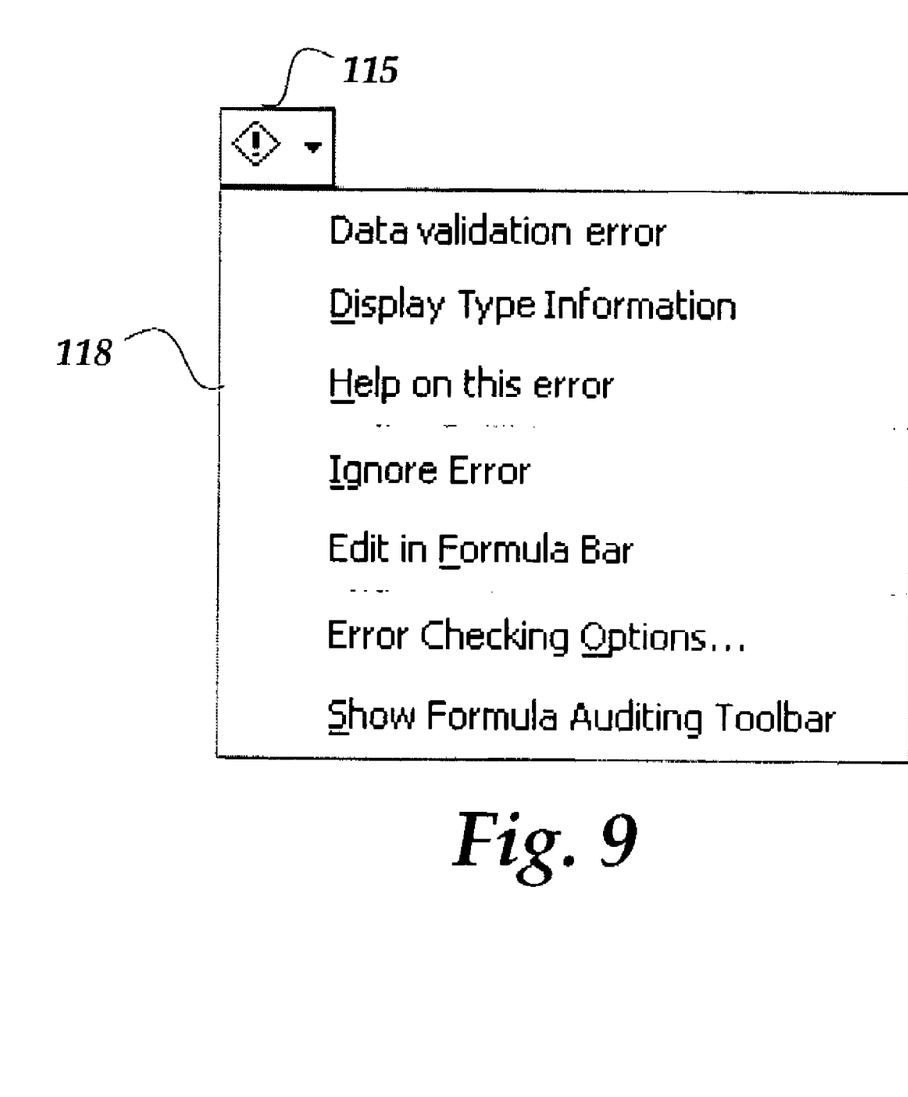
FIG. 9 illustrates an error indicator generated in response to identifying a data type or data value error in one or more inactive list cells in an electronic spreadsheet, according to an illustrative embodiment of the invention.

Once the data type of the list data entry has been determined at operation 610, the logical operations 600 continue at operation 615 where the spreadsheet application program 26 compares the data type of the entered data to the data type for the list cell or cells (i.e., list data type) in which the data was entered. If it is determined that the data type of the entered data is not the same as the list data type at operation 620, the logical operations 600 continue to operation 625 where the spreadsheet application program 26 determines that the data type of the list data entry is invalid. The logical operations 600 then continue to operation 630 where the spreadsheet application program 26, in response to a determination that the data type of the list data entry is invalid, generates and displays a data validation alert for a data type error if the list data entry is in an active cell. An illustrative dialog of a data validation alert for a data type error in an active cell is shown in FIG. 7 and will be described in greater detail in the discussion of FIG. 7 below. The logical operations 600 then continue from operation 630 to operation 632 where the spreadsheet application program 26, in response to a determination that the data type of the list data entry in one or more inactive cells is invalid, generates and displays an error indicator in each of the invalid inactive cells. An illustrative error indicator is shown in FIG. 9 and will be described in greater detail in the discussion of FIG. 9 below. The logical operations 600 then end.

Figure 8:
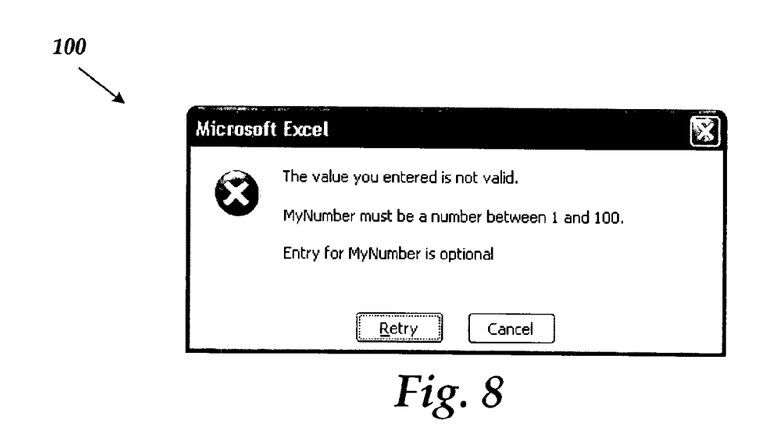
FIG. 8 illustrates an error dialog generated in response to identifying a data value error in an active list cell in an electronic spreadsheet, according to an illustrative embodiment of the invention.

Returning now to operation 620, if it is determined that the data type of the entered data is the same as the list data type, the logical operations 600 continue at operation 635 where a further determination is made as to whether the data entry value based on the list data type is valid. If it is determined at operation 635 that the data entry value is valid based on the list data type, then the logical operations 600 end. On the other hand, if it is determined at operation 635 that the data entry value is invalid based on the list data type and the data entry value is in an active cell, then the spreadsheet application program 26 generates and displays a data validation alert for a data value error at operation 640. An illustrative dialog of a data validation alert for a data value error in an active cell is shown in FIG. 8 and will be described in greater detail in the discussion of FIG. 8 below. The logical operations 600 then continue from operation 640 to operation 645 where the spreadsheet application program 26, in response to a determination that the data entry value in one or more inactive cells is invalid based on the list data type, generates and displays an error indicator in each of the invalid inactive cells. An illustrative error indicator is shown in FIG. 9 and will be described in greater detail in the discussion of FIG. 9 below. The logical operations 600 then end.

It will be appreciated that in alternative embodiments of the present invention, the spreadsheet application program 26 may be configured for foreground and background error checking as data is entered into list cells in order to detect data validation errors. In these embodiments, the spreadsheet application program 26 scans the visible portion of a spreadsheet (including displayed lists) for errors and displays error indicators for errors violating one or more predetermined error rules such as data validation.

FIG. 7 illustrates an error dialog 90 generated in response to identifying a data type error in a list in an electronic spreadsheet, according to an illustrative embodiment of the invention. As described above in the discussion of FIG. 6, the error dialog 90 may be triggered when a user selects a cell with a data entry or types a data entry into a cell in a list. The error dialog 90 also includes text describing the data type ("MyChoice") for the list cell.

FIG. 8 illustrates an error dialog 100 generated in response to identifying a data value error in a list in an electronic spreadsheet, according to an illustrative embodiment of the invention. As described above in the discussion of FIG. 6, the error dialog 100 may be triggered when a user selects a cell with a data entry or types a data entry into a cell in a list. The error dialog 90 also includes text describing valid values for the list cell data type ("MyNumber must be a number between 1 and 100").

FIG. 9 illustrates an error indicator 115 generated in response to identifying a data type or data value error in one or more inactive list cells in an electronic spreadsheet, according to an illustrative embodiment of the invention. The error indicator 115 may be an object-orientated user interface (OOUI). Clicking on the indicator 115 displays a dropdown menu 118 which identifies the type of error and provides a user with a choice of commands to execute in response to the error. For example, the "Display Type Information" command may display a dialog listing all of the data type information for a cell.

Those skilled in the art will appreciate that the spreadsheet application program 26 may also be configured to manage other aspects of list management in alternative embodiments of the present invention. For example, in one embodiment, the spreadsheet application program 26 may be configured to support automatically selecting the list range in response to a print command. In another embodiment, the spreadsheet application program 26 may be configured to binding a list to a data source such as XML data. In another embodiment, the spreadsheet application program 26 may be configured such that when a user hovers a mouse pointer over and clicks the left edge of a list row, the entire list row is selected. Similarly, by hovering over and clicking the top edge of a list column, a user may select the entire list column. Furthermore, by hovering over and clicking the top left corner of a list, a user may select the entire list. In still another embodiment, the spreadsheet application program 26 may be configured such that a user dragging a list row or column within a list will reorder the row or column rather than overwriting existing data.

In view of the foregoing, it will be appreciated that the above-described embodiments of the present invention provide an electronic spreadsheet with functionality for automatically creating, expanding, and validating lists of cells, without manual intervention by a user. As a result, the electronic spreadsheet provides a structure for data in the list which may be easily managed. Still, it should be understood that the foregoing relates only to illustrative embodiments of the present invention, and that numerous changes may be made thereto without departing from the spirit and scope of the invention as defined by the following claims.

We claim:

1. A method in a computer system for automatically creating a list in an electronic spreadsheet, comprising the steps of:
   receiving a user request for selecting a cell range in the electronic spreadsheet for displaying data, the cell range including one or more cells in one or more columns;
   identifying a list range for the selected cell range in the electronic spreadsheet, wherein identifying a list range for the selected cell range comprises:
      determining the number of cells in the selected cell range;
      if the selected cell range contains two or more cells, then identifying the list range as the selected cell range; and
      if the selected cell range contains exactly one cell, then identifying the list range based on the location of the cell in a current region of the electronic spreadsheet;
   determining a header row for the list range, wherein determining a header row for the list range comprises:
      determining whether the list range includes a field name for each column in the cell range; and
      if the identified list range does not include any field names, then automatically generating a field name for each column in the cell range, wherein the automatically generated field names comprise the header row for the list range; and
   generating a border for surrounding the list range to create the list.

2. The method of claim 1, wherein each field name is unique.

3. The method of claim 1, wherein the list range includes user-generated data.

4. The method of claim 1, wherein the list range includes a blank row for inserting data.

5. The method of claim 3, further comprising:
   determining whether the selected cell range includes a user total row for calculating a plurality of aggregation functions for the user-generated data; and
   if the selected cell range includes a user total row, then excluding the user total row from the list range.

6. The method of claim 5, wherein the user total row is one row adjacent to the bottom of the at list range.

7. The method of claim 5, wherein the user total row comprises at least one cell for calculating the plurality of aggregation functions.

8. A method for automatically expanding a list in an electronic spreadsheet, the method comprising:
   determining that at least one previously blank newly edited cell is adjacent to the list, wherein determining that at least one previously blank newly edited cell is adjacent to the list further comprises:
      determining that the at least one previously blank newly edited cell is adjacent to a header row in the list, the header row comprising at least one field name; and
      determining that the at least one previously blank newly edited cell is adjacent to a data row in the list, the data row comprising at least one cell containing data;

automatically expanding the list to include the at least one previously blank newly edited cell, wherein automatically expanding the list to include the at least one previously blank newly edited cell comprises automatically expanding the list to include a new column containing the at least one previously blank newly edited cell;

if the at least one previously blank newly edited cell is adjacent to a header row in the list, then determining whether a data entry in the at least one previously blank newly edited cell duplicates an existing field name in the header row in the list;

if the data entry in the at least one previously blank newly edited cell is identical to an existing field name in the header row in the list, then changing the data entry to a unique field name;

if the data entry in the at least one previously blank newly edited cell is not identical to an existing field name in the header row in the list, then assigning the data entry as a field name for the new column; and if the at least one previously blank newly edited cell is adjacent to a data row in the list, then automatically generating a field name for the new column.

9. The method of claim 8, wherein automatically expanding the list to include the at least one previously blank newly edited cell comprises automatically expanding the list to include a new row containing the at least one previously blank newly edited cell.

10. The method of claim 8, wherein determining that at least one previously blank previously blank newly edited cell is adjacent to the list comprises determining that the previously blank newly edited cell is to a right side of the list.

11. The method of claim 8, wherein the list is structured data.

12. A computer-readable medium having computer-executable instructions for performing a method for displaying an automatically created list in an electronic spreadsheet, comprising the steps of:

receiving a user request for selecting a cell range in the electronic spreadsheet, the cell range including one or more cells in one or more columns for displaying data;

identifying a list range for the selected cell range in the electronic spreadsheet, wherein identifying a list range for the selected cell range comprises:
  determining the number of cells in the selected cell range;
  if the selected cell range contains two or more cells, then identifying the list range as the selected cell range; and
  if the selected cell range contains exactly one cell, then identifying the list range based on the location of the cell in a current region of the electronic spreadsheet;

determining a header row for the list range, wherein determining a header row for the list range comprises:
  determining whether the list range includes a field name for each column in the cell range; and
  if the identified list range does not include any field names, then automatically generating a field name for each column in the cell range, wherein the automatically generated field names comprise the header row for the list range;

generating a border for surrounding the list range to create the list; and displaying the automatically created list on the display device.

13. The computer-readable medium of claim 12, wherein the list range comprises a blank row for inserting data.

14. The computer-readable medium of claim 12, further comprising:
  determining whether the selected cell range includes a user total row for calculating a plurality of aggregation functions for the user-generated data; and
  if the selected cell range includes a total row, then excluding the user total row from the list range.

15. A computer-readable medium having computer-executable instructions for performing a method for automatically expanding a list in an electronic spreadsheet, comprising the steps of:

determining that at least one previously blank newly edited cell is adjacent to the list, wherein determining that at least one previously blank newly edited cell is adjacent to the list further comprises:
  determining that the at least one previously blank newly edited cell is adjacent to a header row in the list, the header row comprising at least one field name;
  determining that the at least one previously blank newly edited cell is adjacent to a data row in the list, the data row comprising at least one cell containing data;
  if the at least one previously blank newly edited cell is adjacent to a header row in the list, then determining whether a data entry in the at least one previously blank newly edited cell duplicates an existing field name in the header row in the list;
  if the data entry in the at least one previously blank newly edited cell is identical to an existing field name in the header row in the list, then changing the data entry to a unique field name;
  if the data entry in the at least one previously blank newly edited cell is not identical to an existing field name in the header row in the list, then assigning the data entry as a field name for the new column; and
  if the at least one previously blank newly edited cell is adjacent to a data row in the list, then automatically generating a field name for the new column; and automatically expanding the list to include the at least one previously blank newly edited cell, wherein automatically expanding the list to include the at least one previously blank newly edited cell comprises automatically expanding the list to include a new column containing the at least one previously blank newly edited cell.

16. The computer-readable medium of claim 15, wherein automatically expanding the list to include the at least one previously blank newly edited cell comprises automatically expanding the list to include a new row containing the at least one previously blank newly edited cell.

17. The computer-readable medium of claim 15, wherein data range references in cells in existing list rows are automatically adjusted to include cells in the new column.

18. The computer-readable medium of claim 16, wherein data range references in cells in existing list columns are automatically updated to include cells in the new row.

* * * * *